UNITED STATES PATENT OFFICE.

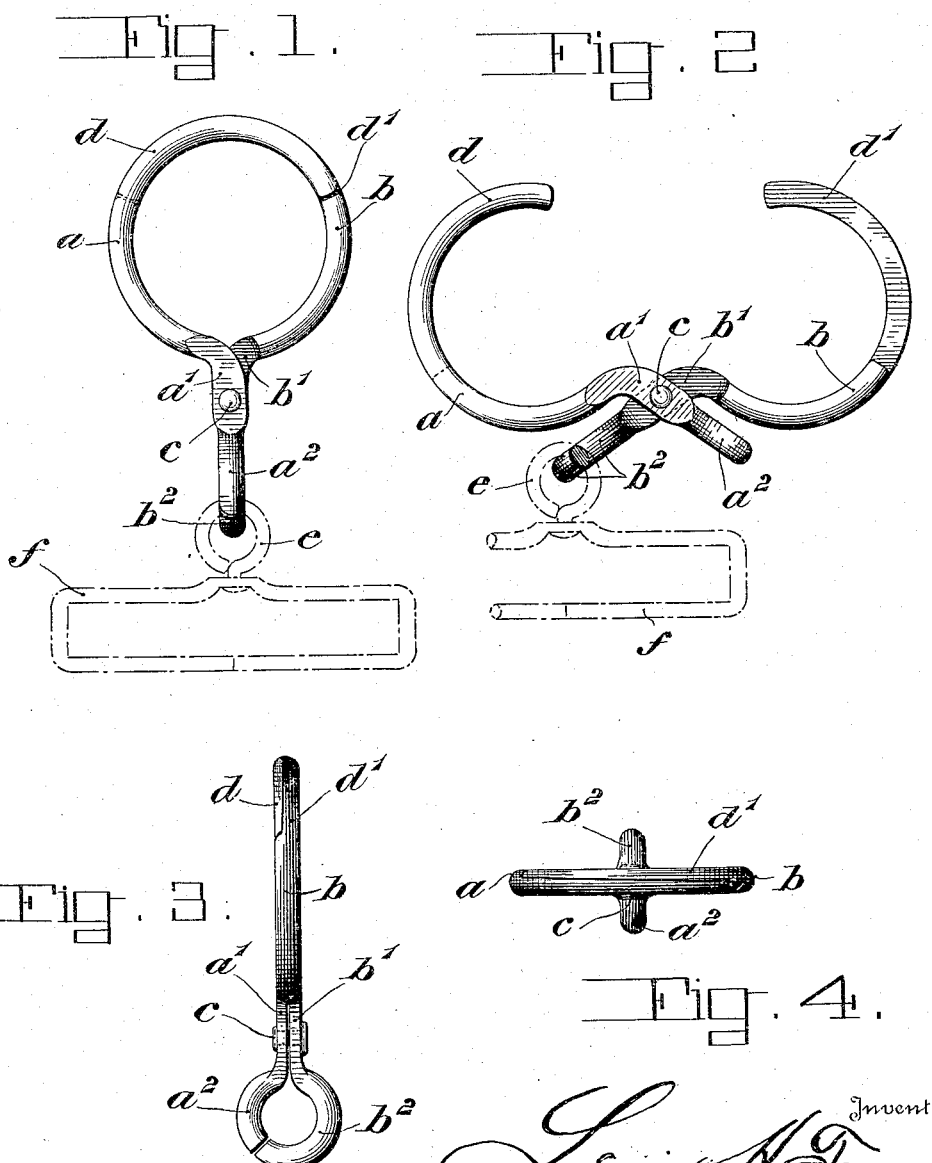

LEWIS H. TORREY, OF WORCESTER, MASSACHUSETTS.

SUSPENSION-HOOK.

1,174,103.  Specification of Letters Patent.  Patented Mar. 7, 1916.

Application filed February 20, 1914. Serial No. 819,947.

*To all whom it may concern:*

Be it known that I, LEWIS H. TORREY, a citizen of the United States, residing at Worcester, in the county of Worcester and State of Massachusetts, have invented or discovered certain new and useful Improvements in Suspension-Hooks, of which the following is a specification, reference being had therein to the accompanying drawing.

This invention relates to an improvement on the suspension hook covered by my U. S. Patent No. 754,158, granted March 15, 1904, and has for its object to provide a suspension hook in which the hook part proper is disposed at a right angle to the curved arms which form the gripping part and which are to be engaged with some object with which the suspension hook or device is to be detachably connected. The hook proper of this device may be opened and closed by moving the pivoted curved arms to different positions, as in the device of my patent above referred to, and by disposing the said hook proper at a right angle to the plane of the gripping arms the device is adapted to be used in connection with a ring or eye which may be engaged with the said hook proper, and which ring or eye need not necessarily have a swiveled connection with a suspension loop, as is practically necessary with the construction covered by said patent.

In the accompanying drawing Figure 1 represents the improved suspension hook in closed position and Fig. 2 shows the same fully opened. Fig. 3 is a view of the improved hook as the same appears looking from the right side of Fig. 1, and Fig. 4 is a view looking from the top of Fig. 1.

Referring to the drawing, in which the similar parts are lettered the same as in my said patent, $a$, $b$ denote two curved gripping arms provided with shanks $a'$, $b'$, respectively, said shanks being pivotally connected by a rivet $c$. The shank $a'$ is provided with a curved extension $a^2$, and the shank $b'$ is provided with a curved hook $b^2$ which is disposed at a right angle to the gripping arms $a$, $b$, and which, in connection with the said curved extension $a^2$, forms a loop or eye adapted to engage a ring, as $e$, which may or may not be swiveled to a loop, as $f$, on which the swing razor strop or any other similar device to be suspended may be properly disposed. The rivet $c$, forming the pivot for the shanks of the arms $a'$, $b'$, is disposed in a plane parallel to the eye composed of the parts $a^2$, $b^2$ and is at a right angle to the arms $a$, $b$. When the suspension hook is to be engaged with some object, as a bed post, to which it may be desired to attach the same, the gripping arms $a$, $b$ are opened out as shown in Fig. 2, and when said arms are thus opened out the hook proper $b^2$ will be opened by the displacement of the curved member $a^2$ so that an eye $e$ may be engaged with said hook proper, and when the parts are returned to the closed position shown in Figs. 1 and 3 said hook proper will be closed to prevent the escape of the eye $e$ therefrom.

While it is preferred to close the hook proper $b^2$ by the curved extension $a^2$, this is not positively necessary, as said extension may be omitted, leaving said hook an open one.

The arms $a$, $b$, as in the construction shown by my said patent, are preferably provided with overlapping parts $d$, $d'$, recessed on their contiguous faces and preferably flattened and slightly inclined so that they may be closed together with a strong frictional contact which will prevent their accidental displacement.

From the foregoing it will be understood that when the gripping arms are engaged with some article with which the device is to be connected the suspension hook proper will stand at right angles to said arms, so that the eye on the device to be suspended will be disposed flatwise with reference to the plane of the gripping arms, and a swiveled connection of the part to be suspended from the hook proper will therefore not be necessary. In other words a swing razor strop suspended from the loop $f$, the eye $e$ of which is not swiveled to the loop, will hang in proper position for use without being twisted.

Having thus described my invention I claim and desire to secure by Letters Patent:

A suspension hook comprising two curved overlapping arms having shanks which are pivotally connected together, one of said shanks being constructed to form an open hook which is disposed at a right angle to the plane of said arms, and the other of said shanks having an outwardly curved part adapted to close said hook and to form with said hook a complete eye when the parts are in positions for use, the overlapping portions of said arms having inclined contiguous faces adapted to have a strong frictional contact with each other when the said arms are closed together, and the pivot for said shanks being in a plane parallel to said eye and at a right angle to said arms.

In testimony whereof I affix my signature, in presence of two witnesses.

LEWIS H. TORREY.

Witnesses:
E. H. H. WILSON,
FRANK L. HALE.

Copies of this patent may be obtained for five cents each, by addressing the "Commissioner of Patents, Washington, D. C."